No. 112, to original Letters Patent No. 9,168.—*Improvement in Looms for Weaving Figured Fabrics.*

*Claim.*—The bell-crank lever $V^2$ when kept in connexion with the grooved collar $U^2$ by a spring, or its equivalent, in combination with the lever $F^2$ and its connecting-rod $H^2$, or any mechanical equivalent therefor, when the lever $F^2$ is operated upon by a filling-thread stop-motion, when the filling-thread breaks or becomes expended.

Also, the pattern chain $s^2$, composed of lags having projections or segment-flanges on the top, and blank lags having no projections on the top, for the purpose of operating rise and fall shuttle-boxes therewith in power-looms, for weaving figured fabrics.

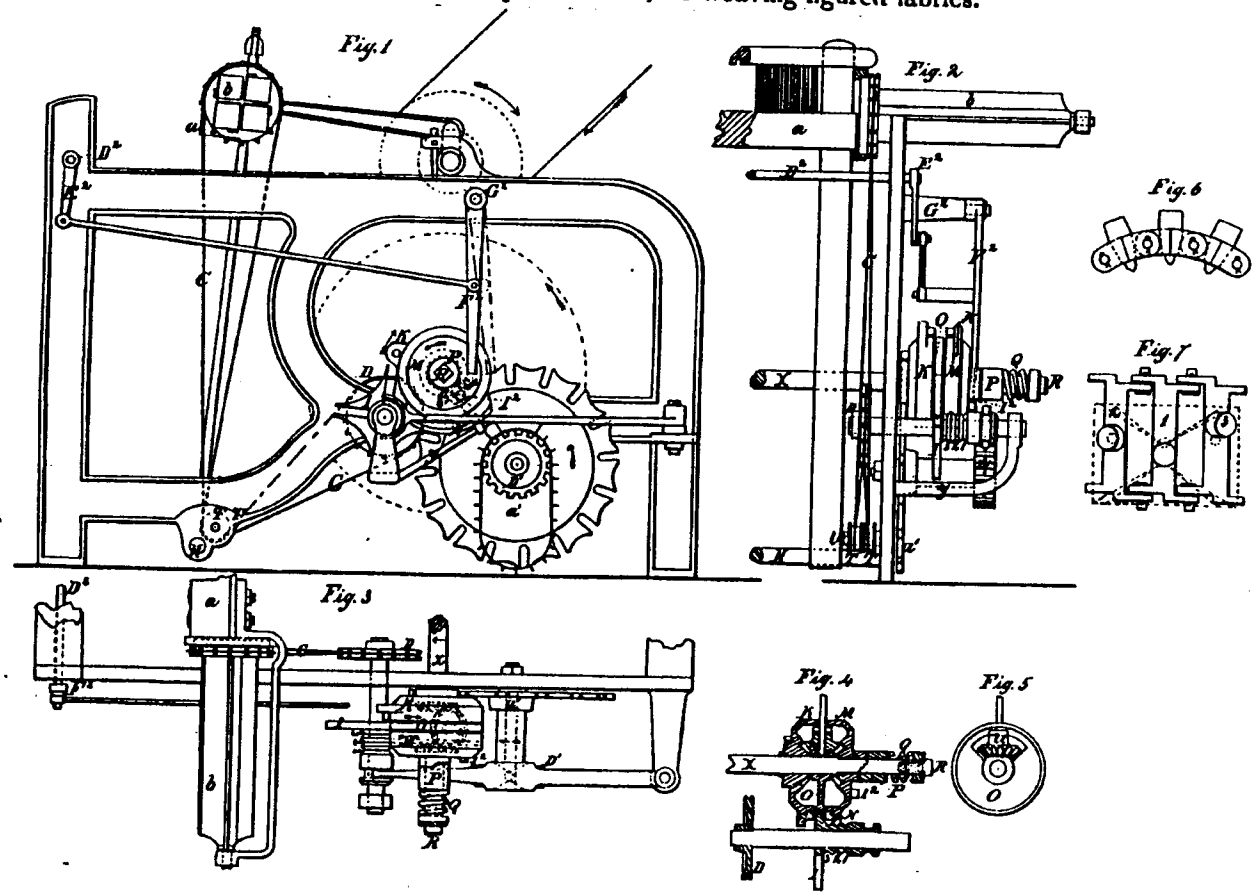

No. 112.

S. & J. Eccles.
Loom.

Sheet 1-2 Sheets.

Patented Jul. 18, 1854.

S. & J. Eccles.
Sheet 2-2 Sheets.
Loom.
No. 112.
Patented Jul. 18, 1854.
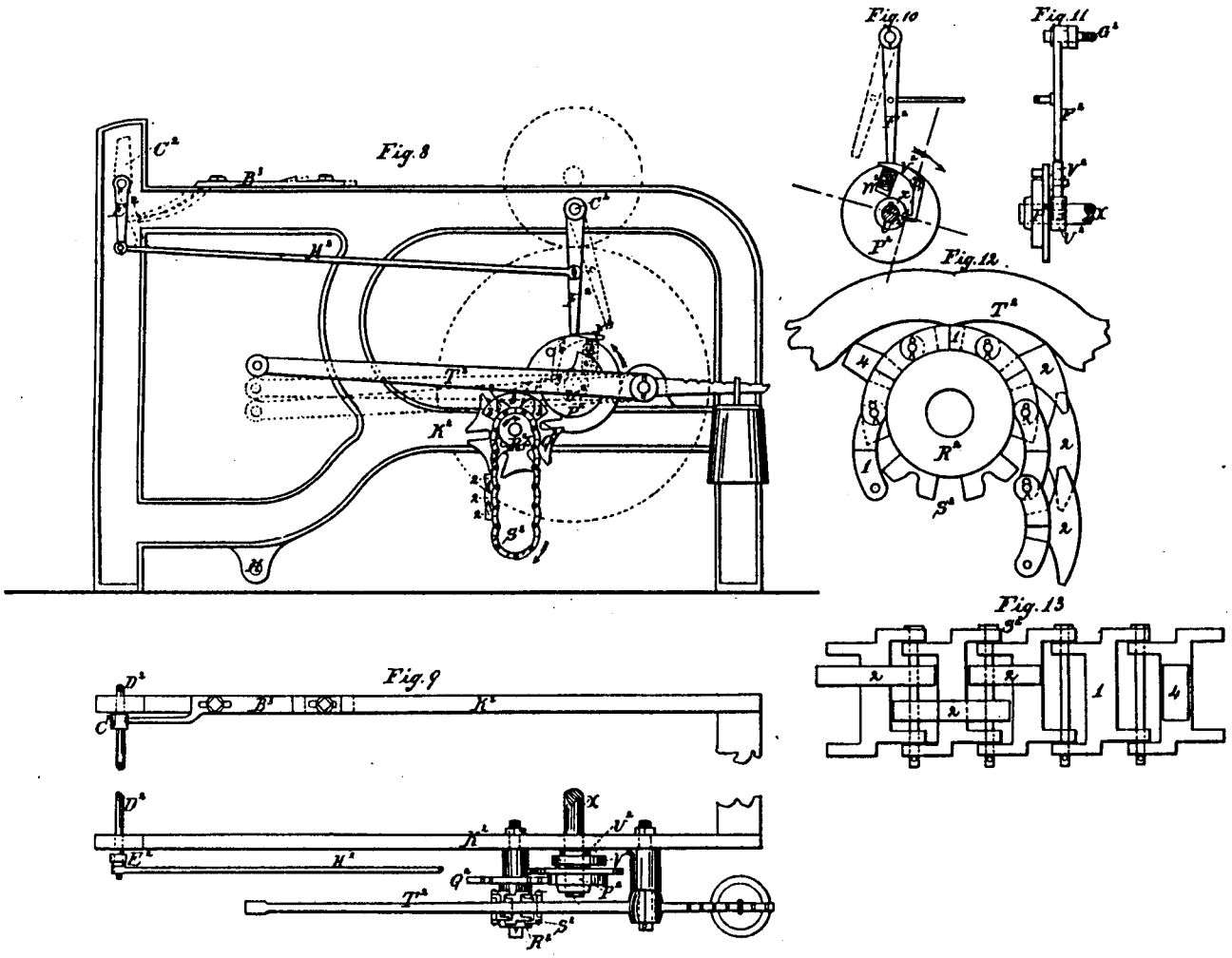
B. PETERS, PHOTO-LITHOGRAPHER, WASHINGTON, D. C.

DEPARTMENT OF COMMERCE
UNITED STATES PATENT AND TRADEMARK OFFICE

---

MISSING PAGE(S)

PATENT NUMBER AI 112 FOR THE ISSUE DATE 07/18/1854 HAS BEEN SCANNED/LOADED, BUT WITH MISSING PAGES(S). UPON RECEIPT OF THE MISSING PAGE(S), THE ENTIRE DOCUMENT WILL BE RESCANNED.

THIS NOTICE IS FOR THE MISSING PAGE(S) CONTAINING:

All Text